US011392868B1

(12) United States Patent
Malamut et al.

(10) Patent No.: US 11,392,868 B1
(45) Date of Patent: Jul. 19, 2022

(54) DATA RETENTION COST CONTROL FOR DATA WRITTEN DIRECTLY TO OBJECT STORAGE

(71) Applicant: EMC IP Holding Company LLC, Hopkinton, MA (US)

(72) Inventors: Mark Malamut, Aliso Viejo, CA (US); Arun Murti, Mission Viejo, CA (US); Adam Brenner, Mission Viejo, CA (US); Lev Ayzenberg, Petakh-Tikva (IL); Sharon Vitek, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/193,772

(22) Filed: Mar. 5, 2021

Related U.S. Application Data

(63) Continuation-in-part of application No. 17/193,294, filed on Mar. 5, 2021.

(51) Int. Cl.
*G06Q 10/06* (2012.01)
*H04L 67/1097* (2022.01)
*H04L 41/50* (2022.01)
*H04L 41/22* (2022.01)
*G06Q 30/02* (2012.01)
*H04L 67/1095* (2022.01)

(52) U.S. Cl.
CPC . *G06Q 10/06313* (2013.01); *G06Q 10/06395* (2013.01); *G06Q 30/0284* (2013.01); *H04L 41/22* (2013.01); *H04L 41/5029* (2013.01); *H04L 41/5096* (2013.01); *H04L 67/1095* (2013.01); *H04L 67/1097* (2013.01)

(58) Field of Classification Search
CPC ....... G06Q 10/06313; G06Q 10/06395; G06Q 30/0284; H04L 41/22; H04L 41/5029; H04L 41/5096; H04L 67/1095; H04L 67/1097
See application file for complete search history.

(56) References Cited

U.S. PATENT DOCUMENTS

| 7,343,319 B1 * | 3/2008 | Walker | G06Q 30/02 705/21 |
| 2006/0020561 A1 * | 1/2006 | Kodimer | G07F 17/26 705/400 |
| 2010/0332401 A1 * | 12/2010 | Prahlad | H04L 63/0428 711/E12.001 |

(Continued)

*Primary Examiner* — Jonathan A Bui
(74) *Attorney, Agent, or Firm* — Staniford Tomita LLP

(57) ABSTRACT

Controlling data retention cost in cloud-based object storage by first obtaining current storage prices from the cloud provider for their different available storage tiers, and receiving user input for different possible retention parameters identity of data source and the retention period per storage tier. A cost calculator calculates the cost per time unit for each storage tier based on the current provider-specified price and the user-specified period. The calculated costs are displayed to the user a UI in tabular and/or graphical form. The user can change the retention period or data source parameters, and any impact of such changes on the cost will be calculated in real time and reflected in the graphical display. If the user changes the retention period to force an immediate movement of data from one tier to another, a data mover control facilitates this movement in the cloud object storage.

19 Claims, 12 Drawing Sheets

1404

| Tier | Days | Cost |
|------|------|------|
| Hot | 90 | $59 |
| Warm | 180 | $78 |
| Cold | 365 | $94 |

(56) References Cited

U.S. PATENT DOCUMENTS

| | | | |
|---|---|---|---|
| 2012/0323821 A1* | 12/2012 | Crk | G06Q 10/08345 |
| | | | 705/400 |
| 2013/0080703 A1* | 3/2013 | Kumagai | G06F 9/5072 |
| | | | 711/E12.002 |
| 2016/0203428 A1* | 7/2016 | Lieberman | G06Q 10/06315 |
| | | | 705/7.25 |
| 2021/0120084 A1* | 4/2021 | Gorantla | G06F 3/0649 |

* cited by examiner

Block Hash Catalog  1110

| Block # | tEnd | Hash |
|---|---|---|
| 2 | <t9> | <H29...> |
| 2 | <t6> | <H26...> |
| 0 | <t4> | <H04...> |
| 3 | <t5> | <H35...> |
| 3 | <t4> | <H34...> |

DATA RETENTION COST CONTROL FOR DATA WRITTEN DIRECTLY TO OBJECT STORAGE

CROSS-REFERENCE TO RELATED APPLICATIONS

The present application is a Continuation-In-Part application and claims priority to U.S. patent application Ser. No. 17/193,294 filed on Mar. 5, 2021, entitled "Writing Data Blocks Directly to Object Storage," and assigned to the assignee of the present application.

TECHNICAL FIELD

This invention relates generally to public cloud object storage services, and more specifically to systems and methods for optimizing storage costs using different tiering periods.

BACKGROUND OF THE INVENTION

Users of large-scale backup and data protection systems usually have data that is stored on a variety of primary storage devices in varying formats that all need to be protected. These data sources can span physical machines, virtual machines (VMs), databases, filesystems or block storage to name a few. Data protection and disaster recovery processes represent the last line of defense for users and protecting this data efficiently with a very high level of reliability and the ability for fast data recovery is critical for maintaining business continuity.

Such systems often use storage area networks (SANs) having disk arrays that store files using block storage techniques. With block storage, files are split into evenly sized blocks of data each having a unique address. Block storage devices are accessible as volumes directly by the operating system and are well-suited for structured databases, random read/write loads, and virtual machine file system (VMFS) volumes. The vast increase of web-based data consisting of unstructured data sets (e.g., multimedia content, archival images, static web content, etc.) has led to an increased use of object storage in which data is stored as objects as opposed to hierarchical files (as for block storage). Each object typically includes the data, an expandable amount of metadata, and a globally unique identifier. This allows storage systems to store massive and readily scalable amounts of unstructured data.

Object storage represents a type of key-value storage that uses an associative array to link a unique key to a value in the data collection to form a key-value pair, and is used extensively in cloud-based storage systems. The Amazon Simple Storage Service ("AWS S3") is an example of a service that provides object storage through a web service interface. Amazon S3, Microsoft Azure, and other similar key-value or object storage systems, are used to store any type of data object for Internet applications, backup and recovery, disaster recovery, data archives, data lakes for analytics, and hybrid cloud storage. The basic storage units of this type of web storage are objects that are organized into buckets. Each object is identified by a unique, user-assigned key. Data can be can accessed through the S3 service from anywhere on the Internet, and requests are authorized using an access control list associated with each object bucket. Such object storage systems provide a highly available, flexible and inexpensive data protection target. However, data systems that contain disparate types of data often cannot easily and efficiently leverage the full benefits of object storage.

For data backup applications, the most common use case for data recovery in backup systems is restoring the most recent version of a file. Existing technologies generally do not employ various efficiencies or optimize for restoring of the most recent version of a data source. Most present deduplication backup systems locally find identical sequences of data between data sources and use references (fingerprints) to avoid storing duplicate data. This is computationally intensive and imposes a high cost to protect data sources. Many products that write directly to the cloud for disaster recovery purposes will store fully changed data blocks as opposed to granular level changes (which requires a much higher level of storage consumption), or will store standard incremental changes (forward deltas) that need to be applied during restore time. This significantly delays the restore time for restoring a most recent version of a file.

Current issues associated with object storage in public cloud systems is the cost charged by cloud service providers for data storage and access. As customers backup their data to the public cloud they incur monthly storage costs to retain their data sources. As stated above, the most common use case in data protection systems is one in which the most recent version of a data source is the most important copy, and earlier copies, such as those taken over many past points in time in time are linearly less important. For example, the data from two days ago is almost always more important than the data from two months ago. Customers typically trade off the cost of storage against the data retention period. Present systems do not effectively allow users to different storage class tiers that may be available in the public cloud to optimize storage costs versus retention periods.

What is needed, therefore, is a system allows a user to specify different retention period and the tiering periods, evaluate the costs of these choices and cause a backup system to apply a specific set of retention and tiering periods to one or more data sources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
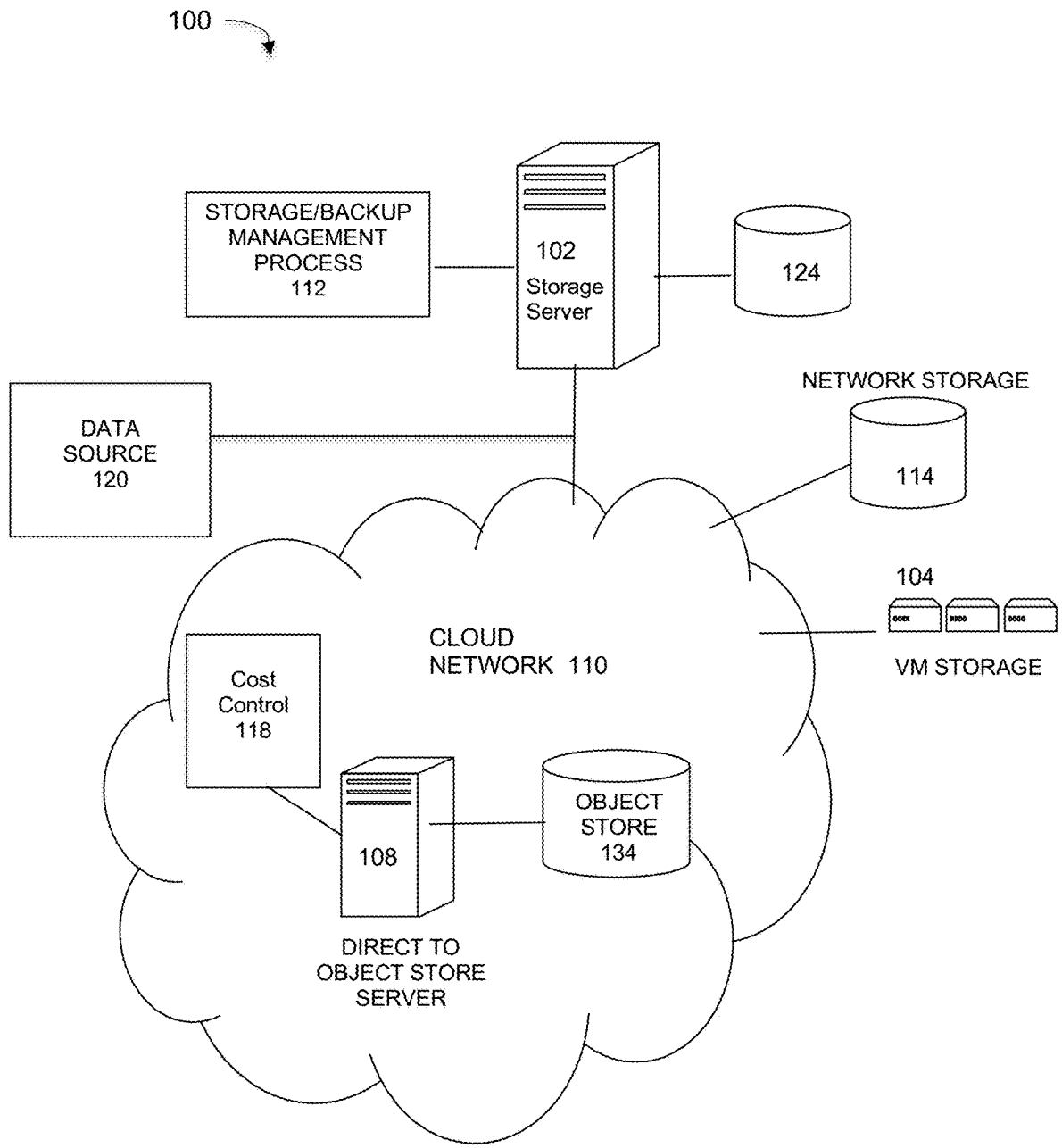
FIG. 1 is a diagram of a cloud computing network implementing a direct to object storage process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud-based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As is known, cloud computing provides a shared pool of configurable computing resources (e.g., computer networks, servers, storage, applications and services) that can be rapidly provisioned and released with minimal management effort. Large-scale cloud networks are often provided by cloud providers that maintain data centers that consolidate vast computing resources such as storage and processing power. By leveraging the public cloud, users can generally protect their data with low cost and involvement as there is no need for them to acquire, deploy or manage a complex data protection environment.

Embodiments are described for a system where data can be efficiently transferred, stored, recovered and organized from a data source directly to object storage which is optimized for key customer workflows. The method is based around a fixed block architecture whereby each data source is serialized into a set of constant size blocks. The client side and server side are decoupled so as to enable efficiency improvements in the server processing and storage model without requiring changes to the client (data source) componentry.

FIG. 1 illustrates a system for implementing a direct to object store system, under some embodiments. In system 100, a storage server 102 executes a data storage or backup management process 112 that coordinates or manages the backup of data from one or more data sources 120 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The network server computers are coupled directly or indirectly to the data storage 114, target VMs 104, and the data sources and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In an embodiment, cloud network 110 may be a private network or it may be a public network provided by a third-party cloud service provider. In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider.

As shown in FIG. 1, cloud network 110 may include cloud storage resources 134. In general, cloud storage is a model of data storage in which the data is stored in logical pools. The physical storage spans multiple servers, and the physical environment may be owned and managed by a hosting company 108 that keeps the data available and accessible, and the physical environment protected and running. The cloud storage 134 may be implemented as a hosted object storage service.

The backup system 102/112 includes a data mover that moves data from data source(s) 120 to target storage, which may be on-premise storage (e.g., DDR), or network storage. In an embodiment, the data mover is configured to move data from the data source to object storage 134 through the server 108. Unstructured data is often stored in cloud storage in a cloud object storage format or simply object storage format. Object storage architecture stores and manages data as objects compared to block storage, which handles data as blocks, and logical volumes and file storage which store data in hierarchical files, and is appropriate for cloud applications because it is elastic, flexible and it can more easily scale into multiple petabytes to support virtually unlimited data growth. Object storage is not particularly suitable for storage applications with high transactional rates, as it is generally not consistent enough for real-time systems such as transactional databases. For long-term or archival storage of large amounts of data, however, it offers significant advantages over block and file-based storage.

The object storage format includes a globally unique identifier for each object along with customizable metadata that is separated to enable other capabilities such as application and user-specific data for indexing. An object identifier is an address tied to the object, which enables the object to be found over a distributed system. Objects may be spread across multiple data centers and data can be found without the user knowing the specific physical location of the data. Object storage, along with the metadata, can be accessed directly via application program interfaces (APIs), HTTP and HTTPS. That differs from block storage volumes, which only can be accessed when they are attached to an operating system. In object storage systems, the data is bundled with the metadata tags and the unique identifier. These objects are stored in a flat address space, making it relatively easy to locate and retrieve the data. This flat address space storage thus helps eliminate the complexity and scalability challenges of hierarchical file system architectures.

The direct to object store system 100 is designed to be efficient in a public cloud deployment, yet also be able to operate using local (on-premise) object storage and compute resources.

Figure 2:
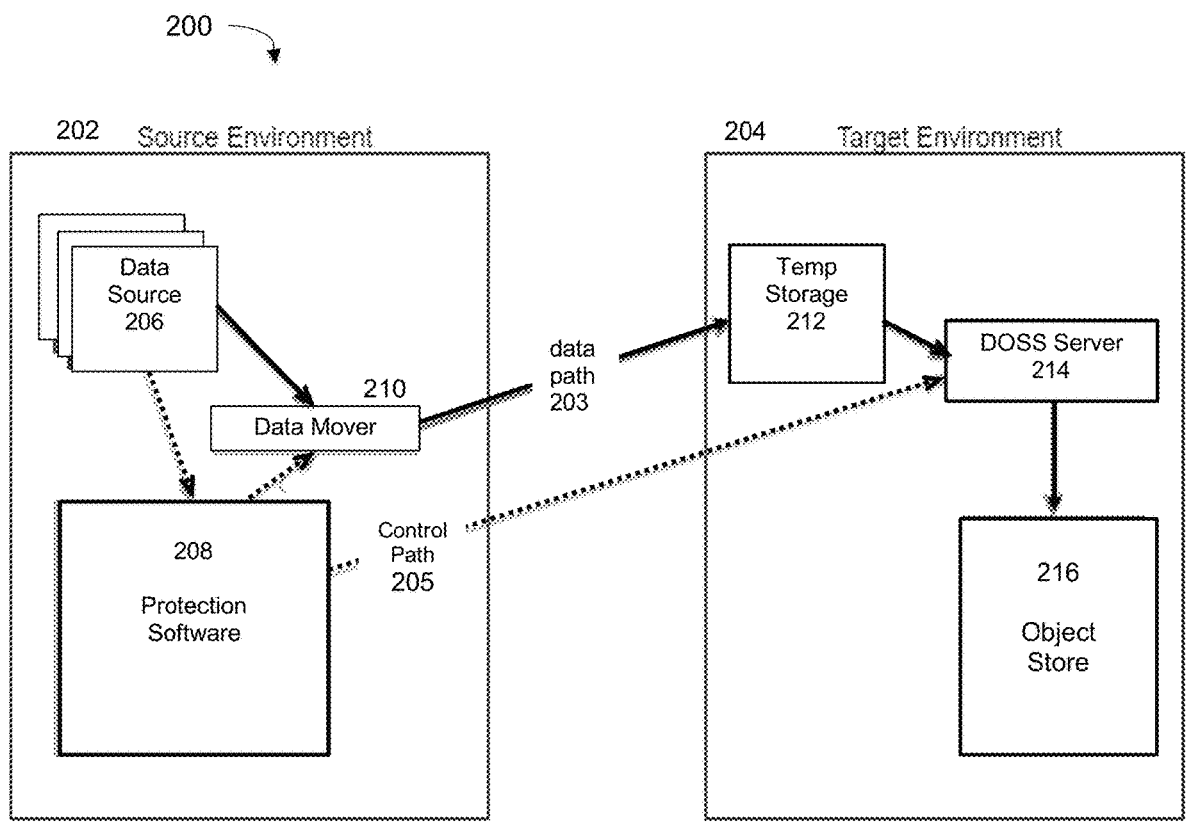
FIG. 2 illustrates a direct to object storage system with certain control flows, under some embodiments.

FIG. 2 illustrates a direct to object storage system with certain control flows, under some embodiments. For the embodiment of FIG. 2, the direct to object store system 200 uses a client/server architecture comprising source environment 202 and a target (storage) environment 204. The source environment (representing the client in system 200) contains one or more data sources 206 that have data backed up using protection software 208. A data mover component 210 sends the data along data path 203 to storage devices in the target environment 204 (representing the server in system 200) in response to control signals transmitted along path 205 from the protection software 208.

During a backup operation the data mover transmits the data to temporary cloud storage 212. Simultaneously, the protection software 208 sends control commands to the DOSS server 214. Using these commands, the DOSS server will process and move the source backup data into the correct form and place this data in persistent object storage 216. Upon completion the temporary data 212 can be deleted. In an embodiment, this server performs or coordinates certain tasks as follows: (1) manages each data source as a separate namespace, (2) breaks up each data source into a series of fixed size sequential blocks, (3) uses a specialized change record type (reverse delta objects), and (4) leverages a simple catalog to reduce data duplication. Based on these attributes, the system provides a resource efficient method for protecting a data source and eliminates or reduces complex and resource intensive garbage collection operations. In addition to efficient backups and recovery workflows, it also favors efficient recovery of the most recent version of a data source over older versions.

In addition to transmitting full blocks for full backups, system 200 is configured to detect sub-block changes, such as through change block tracking (e.g., VMware CBT) in order to format and send the smallest amount of data possible to DOSS system 204. The system may be configured with optional temp storage 212 (a landing zone). The data sent by the various data movers 210 will land either in temporary storage 212 or in the persistent storage 216. The DOSS server 214 will process the packets as necessary, store the post-processed data in object storage 216 and remove any unneeded data.

One aspect of the DOSS system 200 is that all data for each data source 206 will reside in a single non-shared namespace. With respect to the namespace rationale, there is typically very little commonality of data across data sources as data sources are placed into operation. When an application is initially deployed, there may be a high chance it will have a substantial amount of data in common with other data sources through infrastructure code such as operating systems and application binaries. However, as applications are used over time, the amount of data specific to each application instance will dwarf the size of this common data. This system architecture takes advantage of the fact that data deduplication uses a substantial amount of compute resources to find data commonality. The DOSS system eliminates garbage collection in exchange for consuming the extra storage necessary for data source isolation, as compute resources are very expensive in the public cloud, while storage costs are relatively inexpensive.

As is known, when protecting data sources, one of the key attributes to evaluate is data commonality. If multiple data sources have much data in common, then using a shared namespace where multiple data sources can refer to this common data can result in a significant storage cost savings, which is essentially how deduplicated storage systems operate. For storage of data in the public cloud or in a user-owned infrastructure, the cost all of the required resources (storage, compute and REST operations) needs to be minimized. Both the backup and data expiration/deletion phases are major consumers of (expensive) compute resources in shared namespace systems. During the backup process, the data is analyzed to determine how data should be divided into atomic segments and how these segments are persisted in target storage. Determining these segments is computationally expensive. In addition, due to data deletion and data commonality, garbage collection (GC) processes must run periodically so that unreferenced data can be removed to free up storage. As reference counting segments is very difficult and can limit system availability due to data locking, garbage collection usually requires looking at a portion of the data space on each run. Whatever method is employed, the cost to compute data commonality during backup and data deletion is expensive. Besides the costs for storage and compute in any deployment (public cloud or on-premise), there are other costs in the public cloud such as the cost of REST transactions which can become a significant factor.

Figure 3:
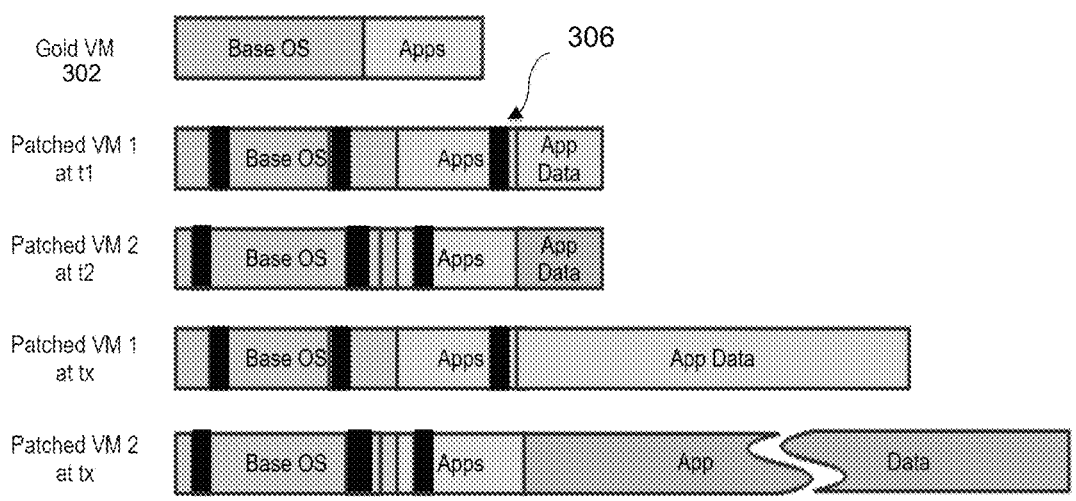
FIG. 3 illustrates an example of changing data commonality among different virtual machines over time.

To illustrate this issue, consider the following case of two Microsoft SQL server data sources running on a VM. A VM typically consists of a base OS, one or more application, and associated application data spread across one or more VMDKs. FIG. 3 illustrates an example of changing data commonality among different virtual machines for this explanation. Initially, the bulk of a VM's disk usage consists of the base OS and application executables, as shown in FIG. 3 as the "Gold Image" VM 302. For this example, this may be a Gold Image of a MS SQL server that includes a specific version of MS Windows which is deployed two times, i.e., in VM1 and VM2. When this image is first deployed, (at time t0) a set of patches to the OS and SQL server are applied for security and functionality. In FIG. 3, the black segmented areas 306 represent patches (or other updates or modifications) applied to the base OS and applications. At a later time, t1, the same Gold Image is deployed and new/different patches are deployed to support an additional customer capability. At this point in time, it can be seen that the two "identical" VMs (VM1 and VM2) have already diverged.

Over time (time tx) each of the VMs have been adding data independently from each other. In many cases, the application data will be unique between the VMs and this data size will dwarf the base system of just the OS plus application binaries. Also, even given identical roots, the VMOS and application upgrades and patches are often applied unevenly, which further contribute to differences between the VMs. Thus, in most typical use cases, the amount of commonality across multiple data sources is low.

Figure 4:
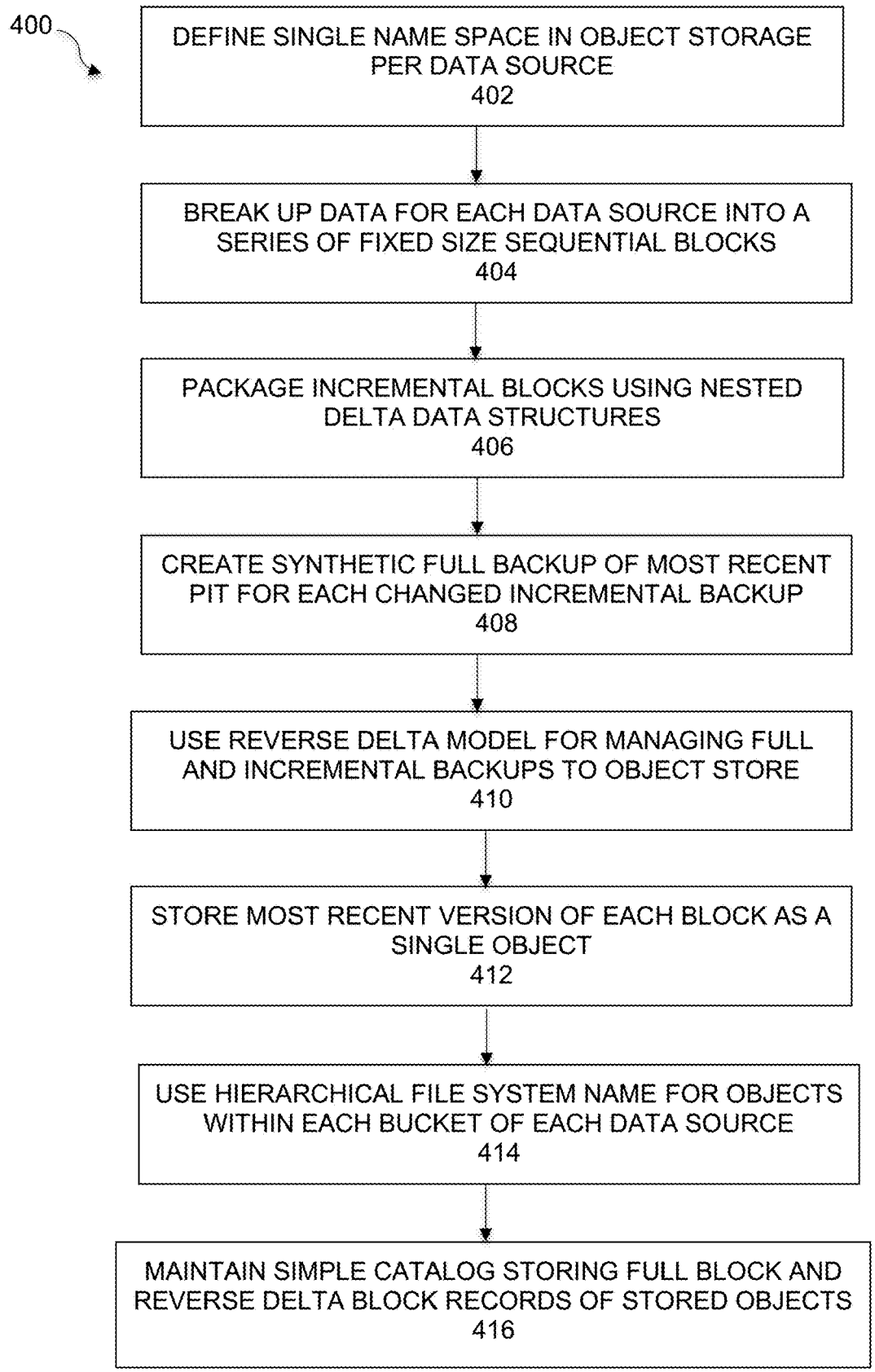
FIG. 4 is a flowchart illustrating an overall process of implementing a direct to object store system, under some embodiments.

FIG. 4 is a flowchart illustrating an overall process of implementing a direct to object store system, under some embodiments. Process 400 begins with defining a single, non-shared name space in object storage for each data source, as described above. This leverages the data divergence common for most deployed systems, as illustrated in FIG. 3 by utilizing relatively less expensive storage resources instead of compute resources in the cloud. For each data source, the data is then organized by the client into a series of fixed size sequential blocks for transmission and storage in object store 212 or 216, step 404. For this process, the data mover 210 will break up and transmit data respecting block boundaries and the DOSS server 214 will likewise organize and write blocks as a separate object in object store 216. The data source 206 is thus viewed as fixed sequential blocks.

Figure 5:
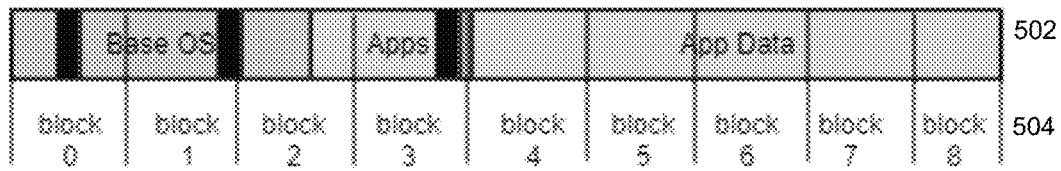
FIG. 5 illustrates the organization of source data into a series of fixed-size sequential blocks, under an example embodiment.

FIG. 5 illustrates the organization of data source 500 into a series of fixed-size sequential blocks, under an example embodiment. As shown in FIG. 5, the data comprises the OS, application binary and user content data in any appropriate organization, 502. The base OS data, application program code, and application data may be sequenced in any order and comprise data segments of any size, which change over time, as illustrated in FIG. 3. In an embodiment, this data 502 is organized into uniform sequential blocks 504. All blocks are of the same size, such as 4 MB or 1 GB each, or any other appropriate size. Each block may span one or more different types of data. Thus, as shown in the example of FIG. 5, some blocks contain OS and application binary code (e.g., block 2), while others may contain only application data (e.g., blocks 5, 6, 7, 8).

FIG. 5 illustrates a data source that may be a VM containing OS, application code, and data, as shown. It should be noted, however, that the data source may be any source of data, such as a large database file or file system, and so on. In this case, the source data may comprise only App Data and no Base OS or Apps code. Likewise, other data sources may contain comprise different compositions of data types depending on their configuration. Regardless of data type or composition, the data 502 is organized into the uniform blocks 504.

Figure 6:
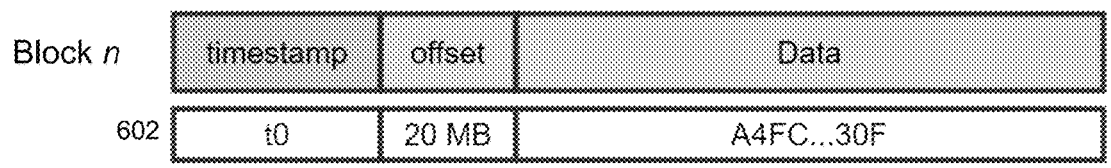
FIG. 6 illustrates a data transmission format for uniform sequential blocks, under some embodiments.

This sequential block data structure 504 is used for transmitting data between the client data mover 210 and the object store 212 or 216. During a full backup, the data full data source will be broken up into a series of blocks as shown, and these full blocks will then be packaged and sent to the server using the format shown in FIG. 6. Each block (Block n) is formatted to contain a timestamp, an offset value, and the block data. FIG. 6 illustrates example values 602 for each of these data elements. For the example of FIG. 6, if the original data source is broken up into 4 MB blocks, the data 602 would represent block number 5 and the data portion would contain 4 MB of pre-compressed data. The block number can be derived by the offset from block 0, which for an offset of 20 MB for 4 MB blocks yields block number 5. During incremental backups, intelligent clients will know which blocks have changed, the offset of the change per block and the size of the changed data. This will allow the data to be packaged in an efficient manner that will eliminate unnecessary bandwidth usage.

Figure 7:
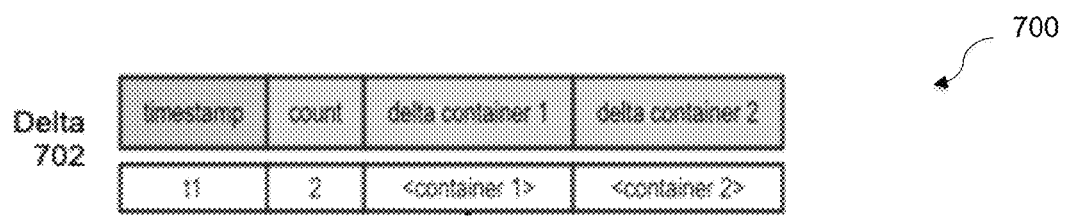
FIG. 7 illustrates the packaging of incremental blocks using nested delta data structures, under an example embodiment.
Figure 7:
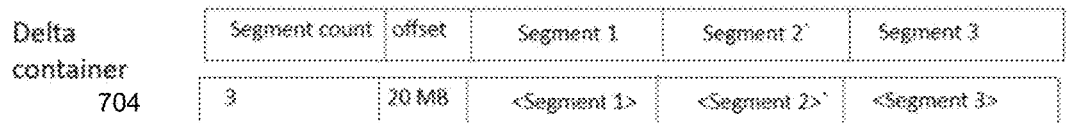
Figure 7:
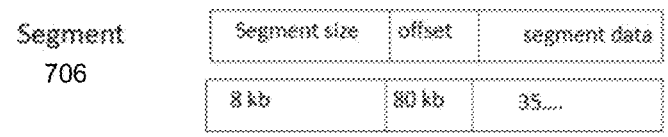

With reference back to FIG. 4, once the client source data has been broken up into, the blocks are then packaged into nested delta data structures, step 406. FIG. 7 illustrates the packaging of incremental blocks using nested delta data structures, under an example embodiment. The nested delta data comprises data for segments 706 within delta containers 704 for deltas 702 at specific timestamps. A delta is sent as a stream of data consisting of each of the data elements of diagram 700 for any number of containers 704 within the delta 702 and segments 706 within the delta container 704. For purposes of illustration, FIG. 7 shows the composition of this data stream as three separate data structures, though they are actually packaged sequentially in a single stream.

The illustrated data structures of FIG. 7 include a delta data structure 702 containing the timestamp, number of changed blocks ('count'), and entries for delta containers 704 having changed blocks (e.g., container 1 and container 2). Each changed block is represented in delta container data structure 704, which contains the number of changed segments within that block (segment count'), the offset of the block, and each segment that is changed for that block (e.g., segment 1, segment 2, segment 3). Each changed segment is represented by data structure 706 that contains, for each changed segment within a block, the segment size, the segment offset into the block, and the segment data. As previously stated, the data of FIG. 7 is packaged together, such that the entire delta 702 is sent as a stream. For the example of FIG. 7, this stream consists of the following: timestamp+count+segment count (for delta container 1)+offset for segment 1 followed by 8K, 80K and the data 35EC. The data stream then continues with the segment size/offset/segment data for segment 2, then the segment size/offset/segment data for segment 3. Next is the segment count (for delta container 2)+offset for segment 1 of container 2 followed by the segment size/offset/segment data for this segment 1, and so on.

For further purposes of clarity, only a portion of the entire possible data stream for delta 702 is shown in diagram 700. This portion comprises the branch for block 1 of container 1 of the delta 702. It can be appreciated that an entire delta data stream can be formed for container 2 of delta 702 and blocks 2 and 3 for delta container 704, and so on, for any practical number of containers and segments within each container.

The example of FIG. 7 illustrates the processing of the block of container 1 starting at absolute offset 20 MB. At t0 the full block starting at offset 20 MB is sent in its entirety to the object store 212 or 216. At the first incremental backup time (t1), two blocks are changed as referenced by the number 2 in the 'count' data element at t1. There is one at offset 20 MB and a second block (not shown) indicated by <container 2>. The block at offset 20 MB has three segments that are modified, as indicated by the value '3' in the 'segment count' entry. The first modified segment in the 20 MB block has an 8 KB extent and starts at offset 80 KB from the start of the 20 MB block (for total offset of 20,080K from the start of the data source). The delta block record 706 also contains the modified data. The data portion of these structures (e.g., the 'block data' field) may be compressed prior to transmission and will be stored in a compressed format based on which cost is cheaper, i.e., the cost to store versus the compute cost for decompression. These packets can also be encrypted for transmission to ensure security and data integrity.

For the embodiments of FIGS. 6 and 7, the segment 706 offset is a relative offset, while the delta container 704 offset and the block 602 offset are absolute offsets. This enables the system 200 to decouple the data being sent by the client 202 from how it is processed by the DOSS server 214 and organized when persisted in object store 216. While a block size of 4 MB may initially be used, it may be later determined that a different block size is desirable. This will allow the DOSS server 214 to organize or re-organize its data block size in the future without impacting the client 202.

For less sophisticated clients, changed blocks may be sent in their entirety. This, however, will generally result in slower backups, higher bandwidth usage and higher storage costs due to the unchanged data sections being sent and stored unnecessarily. Intelligent clients that can detect sub-block changes may send delta blocks as described above or optionally send full blocks as needed, such as in the case where a substantial amount of data in a block has changed.

In an embodiment, the DOSS system 200 implements a logical data organization. that is designed to be cost-efficient and high performance for the most important use cases. As backups occur with the most frequency, they must execute efficiently and incur a low cost. While users may choose to store many point-in-time (PIT) copies of a data source, it is nearly always the case that one of the most recent versions of a data source is the most often recovered version and requires the lowest recovery time objective (RTO). When a disaster recovery event or data error occurs, a low RTO is critical to a business in order to get an application back online in the shortest possible time. Conversely, recovery of older versions is typically due to lower priority requests (e.g., analysis or test uses), and therefore a lower RTO is acceptable. In fact, it is generally the case that the single most recent copy of a data source is exclusively required in a disaster or error recovery scenario. The DOSS system 200 is thus configured to so that the most recent version of the stored data has the lowest RTO.

Although saving the full data source from every possible PIT backup provides equally quick recovery for any PIT, there is a significant storage cost that would be incurred by this simplistic technique. In order to be storage (cost) efficient, the DOSS system only saves a full copy of the most recent version of a data source and supplements this latest full copy with delta records that are used to synthesize previous PIT copies of the data (reverse delta objects).

As shown in FIG. 4, process 400 creates a 'synthetic full' backup of the most recent point in time for every incremental backup where a source data block has changed, step 408. It will create a reverse delta record that can be used to synthesize the prior PIT version of the data. In order to accomplish this, the DOSS server will take change records for the current PIT, and create a reverse delta record and a new synthetic full backup.

The DOSS process thus uses a reverse delta model for efficient management of full and incremental backups, step 410. This helps optimize cost and performance through data organization for the key workflows, and enables the lowest RTO to the most recent version of a data block while minimizing the required storage. The reverse delta model always stores the most recent version of each block as a single object, step 412. In addition, it also stores specialized reverse delta incremental objects. Each reverse delta object contains the data necessary to transform a complete block to a prior state or point in time. These deltas are applied successively (most recent to oldest) on a block to transform the most version of a block to any prior point in time that is retained.

Figure 8:
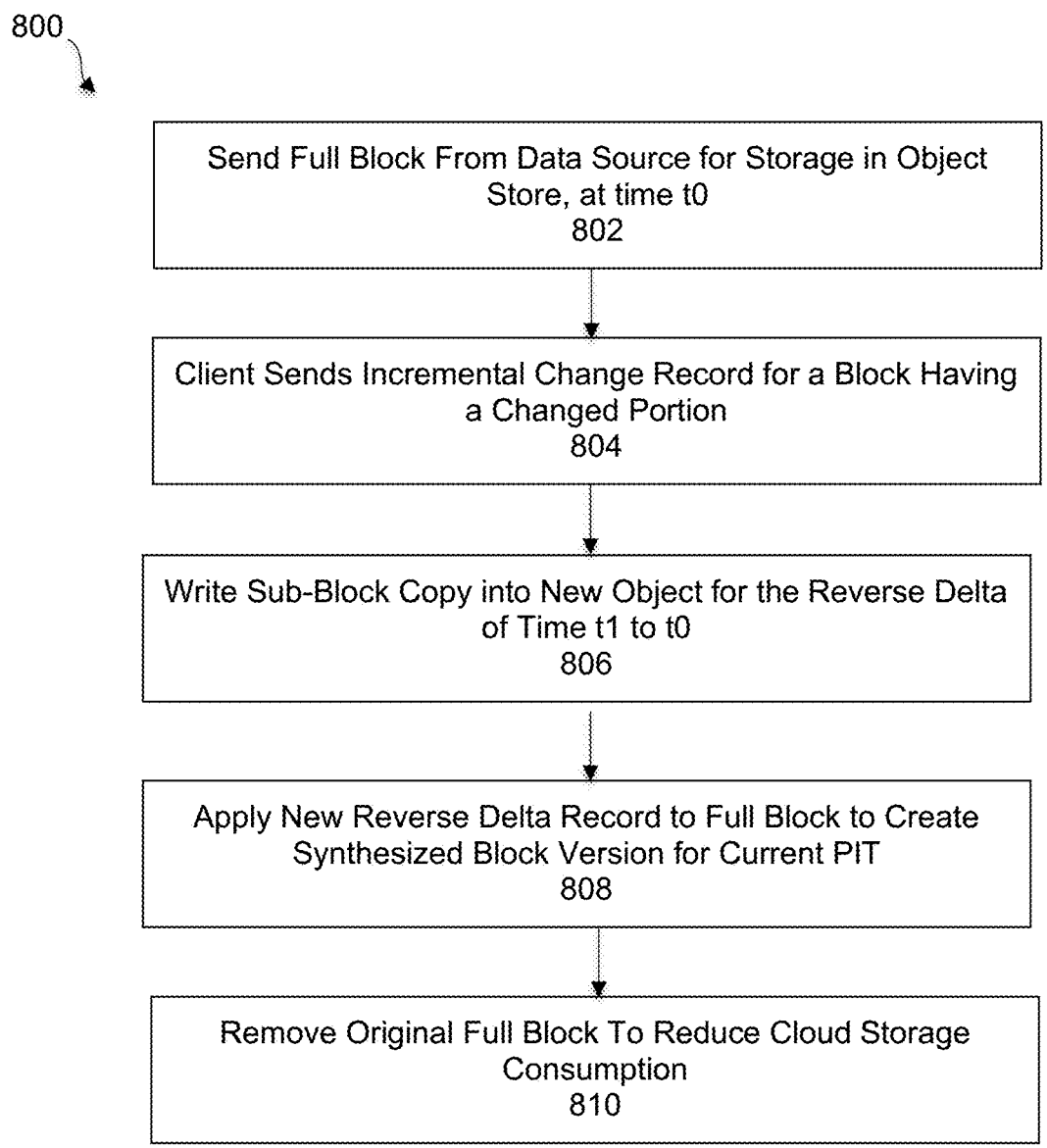
FIG. 8 is a flowchart illustrating a method of deriving a reverse delta object for creating a synthetic full backup, under some embodiments.
Figure 9A:
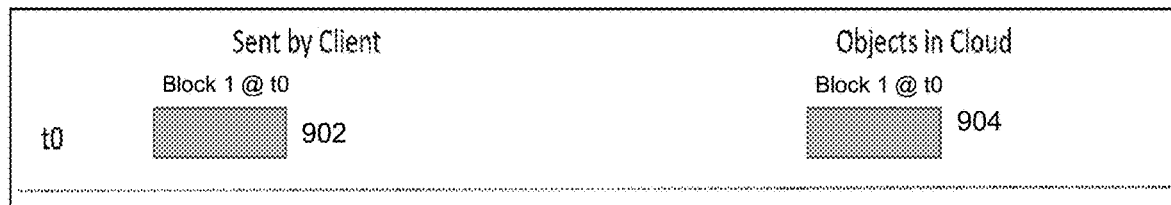
FIGS. 9A, 9B, 9C illustrate an example sequence of processing data blocks sent by a client to a cloud-based object store for deriving a reverse delta object, under some embodiments.

FIG. 8 is a flowchart 800 illustrating a method of deriving a reverse delta object for creating a synthetic full backup, under some embodiments. As shown in process 800 of FIG. 8, at an initial time (t0), a full block from the original data source 206 is sent by the client 202 for storage in the object store 212 or 216, step 802. This is illustrated in FIG. 9A as an example of a full block (Block 1@t0) 902 sent by the client at time t0 to be stored as an object 904 in cloud storage.

As shown in step 804 of FIG. 8, for incremental backups, the client sends an incremental change record for a block as it detected a change in a portion of the block in the data source between t0 and t1. For the figures and description, the time marker t0 represents a first PIT, and later times are denoted t1, t2, t3, and so on, to a present point in time, tx. Thus, the numeric value of a marker increases as time proceeds, and t0 is always the first PIT.

Figure 9B:
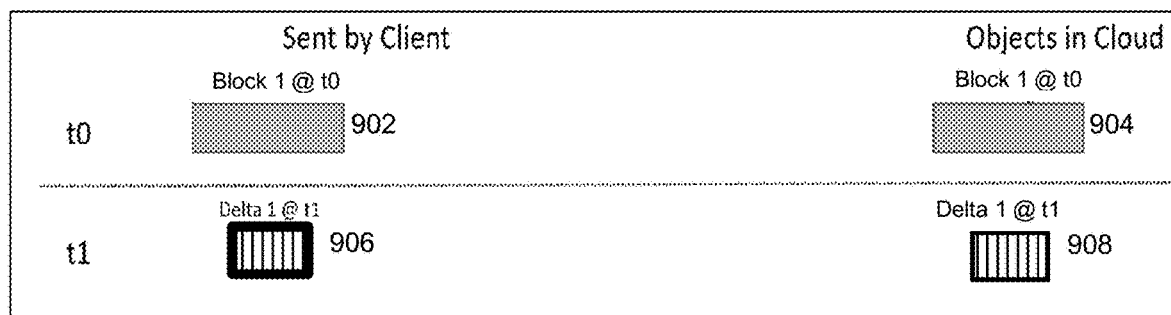
Figure 9C:
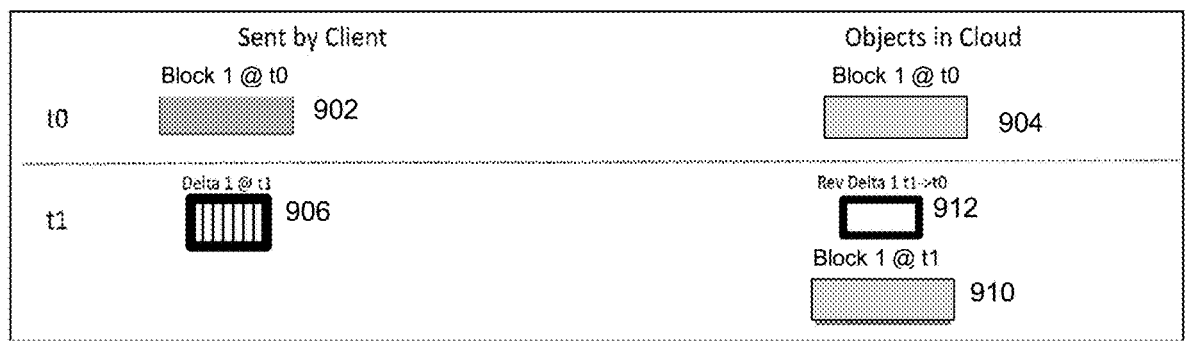

FIG. 9B shows at time t1, the client sends the delta data 906 for an incremental change to the cloud, where it lands there temporarily unchanged as the same delta object, denoted 908. FIG. 9C shows that the DOSS server extracts the area mapped by 908 from the object stored full block 904 and generates a reverse delta object 912. It then takes the stored delta object 908 and copies it to the same mapped area in full block 904 to generate the synthetic full backup at time t1 (Block 1@t1), 910. Then full block 904 and delta 908 objects are then deleted from the cloud, leaving only the synthetic full backup object 910 and the reverse delta object 912 for time t1 in the object store in the cloud. The overall process of process 800, as exemplified in FIGS. 9A-9C now results in the cloud object store containing a synthesized full version 910 of the block at time t1, and the data necessary to step the state of block 1 backwards from t1 to t0, as encapsulated in the reverse delta object 912.

The process of FIG. 8 enables the quickest RTO for the most recent version of a block, as it is embodied in a single object (e.g., synthesized full block 1, 910). To obtain a previous version of an object, the reverse delta objects are applied starting with the most recent delta object. In the example of FIGS. 9A-9C, the reverse delta objects (t1 t0) 912 can be applied to the new full block (Block 1@t1) 910 to synthesize the original version of the block at t0 (Block 1@t0) 902/904. This illustrates a significant the advantage of the reverse delta model. It is highly storage efficient, enables the lowest RTO for the most recent copy of the data, and enables a simple data expiration and data tiering model, as the oldest reverse delta objects can simply be tiered or deleted.

Figure 10:
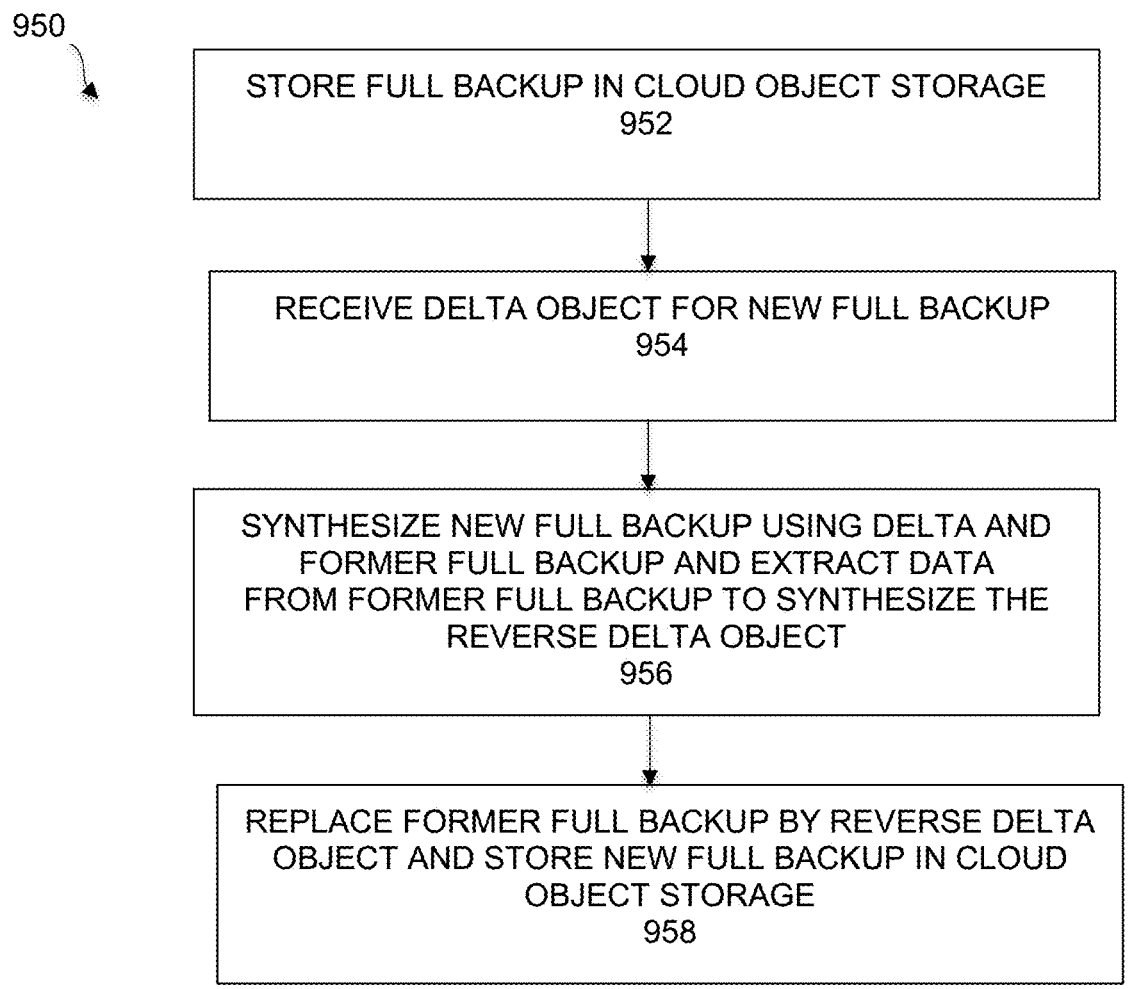
FIG. 10 illustrates an example reverse delta object data structure, under some embodiments.

FIG. 10 is a flowchart that illustrates an overall process of generate a new full backup using a reverse delta object applied to a previous full backup, under some embodiments. FIG. 10 summarizes method enabled by the delta and reverse delta objects of FIGS. 9A to 9C. The process of FIG. 10 begins with a last full backup (904) stored in the cloud object store, 952. During a data protection operation, the system DOSS server 214 will receive a delta object for a new full backup, 954, for any incremental changes to the backed up data that change blocks in the backup image. This new backup renders the full backup of 952 to be a 'former full backup.' The DOSS server 214 synthesizes a new full backup 910 using the delta object 908 and the former full backup 904 and extracts data from the former full backup 904 to synthesize the reverse delta object 912, step 956. The server then replaces the former full backup by the reverse delta object and stores the new full backup in cloud object storage, 958.

In order to manage the reverse delta objects, embodiments of the DOSS system use a block hash catalog is maintained to manage the lifetime of each object. This is shown as step 416 of overall process 400 of FIG. 4, and will be explained in further detail below.

Figures 11, 12:
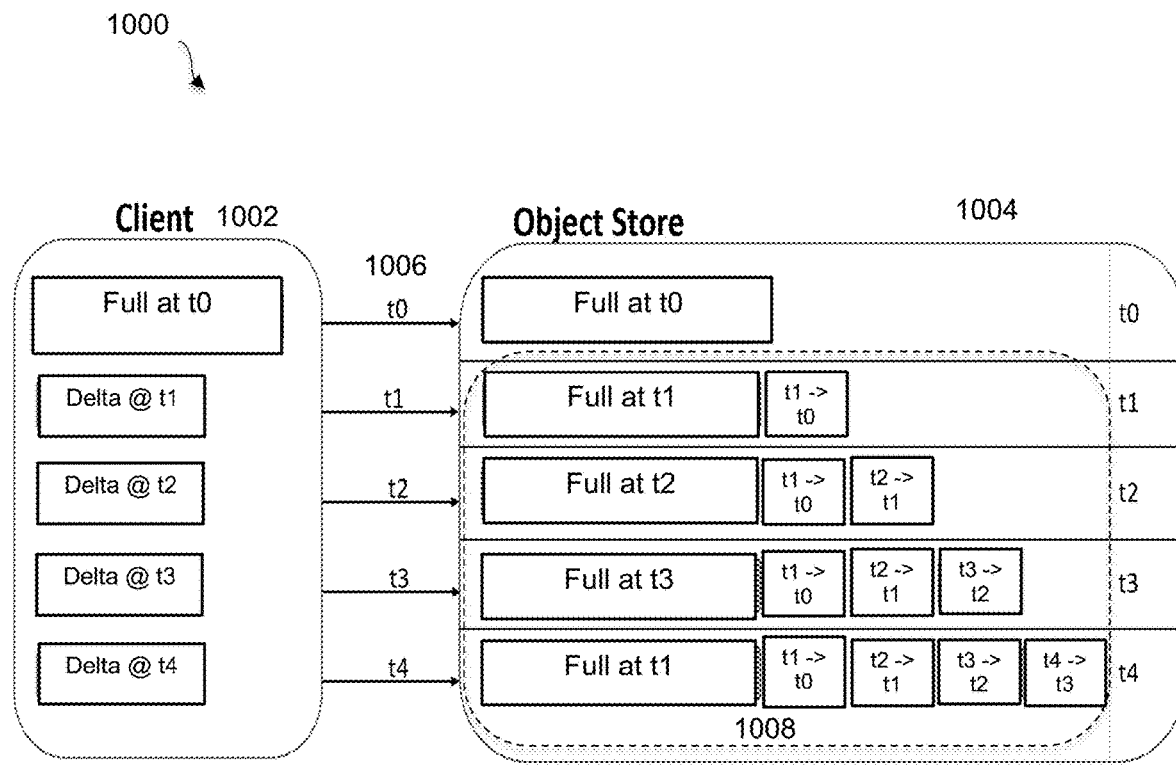
FIG. 11 illustrates a layout and example entries for a block hash catalog for the direct to object storage system, under an example embodiment.
FIG. 12 is a flowchart that illustrates an overall process of saving data directly to a public cloud object store, under some embodiments.

As discussed previously, a reverse delta object is computed and stored for every changed block for all retained point in time backups (PITs) in the form of reverse delta objects. FIG. 11 illustrates an example reverse delta object data structure implemented on the object store, under some embodiments. Data structures in diagram 1000 of FIG. 11 represent what data is sent by the client and the resulting contents of the object store for a single block that exist at various points in time. For diagram 1000, the time intervals 1006 go forward in time from t0 (initial) to t4 (present) through intervening PITs t1, t2, and t3, for example. The client 1002 contains a full backup at time t0 and a sends a delta for every point in time t1, t2, t3 up to the present time, t4, and these deltas in the client 1002 essentially represent forward deltas as used in many current systems. This information is then passed to the object store in the public (or private) cloud which then creates reverse delta objects to produce a data structure where the full backup is available for the present or most recent PIT so that it can be quickly restored instead of recreated (synthesized) using forward deltas, as in current systems. It should be noted that if a block is unchanged between two points in time, no delta record will be changed and therefore no reverse delta object will be computed or stored. This is illustrated in FIG. 12 where there is not an entry for every PIT.

The example of FIG. 11 illustrates transmission of backup and delta data from client 1002 to object store 1004 for each PIT of time intervals 1006, such as from t0 to t4 for a backup of a single block that was modified at each of times t1, t2, t3 and t4. As shown in FIG. 10, each PIT backup (t0, t1, t2 . . . ) has a full copy of the data for the most recent PIT. In addition, for blocks modified during any PIT, a reverse delta record (e.g. t1→t0) is created. These reverse delta objects are used when restoring to a previous PIT copy of a block that was modified. For example, if at t1, there is a request for PIT t0, the system will take the 'Full at t1' object, apply the reverse delta (t1→t0) to it in order to synthesize a version of the block that existed at t0. Likewise, if at t4 there is a request for PIT t1, the system will start with the 'Full at t4' object, and apply the reverse delta t4→t3 followed by applying the reverse delta t3→t2 and finally applying the reverse delta t2→t1. The result is that the data 'Full at t1' will be synthesized through this application of reverse delta objects starting from the most recent time first. As discussed previously, this will yield the lowest RTO for the most recent PIT copy. It should be noted that although FIG. 10 shows one reverse delta object for every point in time, there can be zero or more reverse delta objects per block. The actual number of reverse delta objects per block will be the same as the number segments 706 per block.

As a converse to the above, the RTO will increase as is described above for older versions which is acceptable as the RTO for these older copies typically is less critical. An important advantage of the reverse delta format is that deltas that refer to old copies are candidates for moving to a less expensive tier of object storage which can further be used to reduce cost.

Expiring a prior PIT is as simple as deleting a reverse delta object. For example, if at t4, PIT t0 is to be expired, DOSS simply removes the reverse delta t1→t0. Note that the processing required for reverse delta objects is nearly identical to the processing required when expiring a standard incremental (forward delta). Given this fact that the processing will be incurred any event, the reverse delta approach consumes almost no additional net resources while optimizing for RTO of the latest version.

For the embodiment of FIG. 11, the data elements shown in region 1008 of object store 1004 are computed by cloud or object storage processes, and the full data is stored at every current point in time (t0 to t4). The full data set at any PIT was not sent from the client to the object store, but was instead created synthetically in the object store or in the public cloud for the object store.

As can be seen in FIG. 11, a full (synthetic full) backup is stored in the object store 1004 for each PIT, in contrast to the client, which only stores a single full copy of the data for any PIT. This synthetic full backup is created by applying the reverse delta object data to the full backup at the next recent PIT. Using the object storage data structure of system 1000, to restore the present or most recent backup data from the object store 1004, (at t4), simply involves sending the full at tx from the object store to the client 1002, and then apply forward deltas to obtain a present full backup, as required in present systems. System 1000 instead always maintains the full backup at each PIT, including the present PIT, by synthesizing (on the object store) the full backup from the regularly provided reverse delta objects. The client does not hold any backup datasets, it generates delta objects, transmits them to the cloud and then deletes the delta objects.

With respect to the contents of the object store 1004, an object store bucket will exist for a set of data sources. Within each bucket, multiple data sources will use object storage names that resemble a hierarchical file system. This is shown as step 414 of FIG. 4. Each object will start with a UUID that uniquely identifies a single data source. Following this UUID, there will be a block number. After the block number will either be the word "full" or a number that represents the timestamp for each incremental. An example of data entries for the object store bucket can be given as follows:

A472 . . . 3D7/2/Full=Most recent version of block #2 for data source A472 . . .

A472 . . . 3D7/2/<t9>=Reverse Delta for block #2 that was valid up to time <t9>.

A472 . . . 3D7/2/<t6>=Reverse Delta for block #2 that was valid up to time <t6>.

In an embodiment, the object store elements are given names that can be readily catalogued. For this embodiment, a simple block hash catalog of these objects is maintained in order to ensure that data which exists on the client is not needlessly retrieved from the DOSS server during a restore operation, as shown in step 416 of FIG. 4. The block hash catalog is stored on the DOSS server and contains the full block record and all reverse delta block records for each stored object. This allows the client to specify specific PITs for which data is to be retrieved or restored, where the client computes and sends hashes for all blocks at a particular PIT. For each block and timestamp, the server has appropriate hash values helping it determine which data to reconstruct and provide to the client. This mechanism essentially compares what is local to the client and what is on the server to minimize what is transmitted between the two. The block hash catalog thus helps define which blocks the server must compute (optionally) and send. If the server determines that the client already has the correct version of a block, no data will be computed by the server and no data will be transferred from the server to the client.

Each unique object includes a hash of the entire block. FIG. 12 illustrates a block hash catalog with some example records, under an example embodiment. This catalog lists the hash of each block for every point in time that it is changed. The block hash catalog comprises a table 1110 listing hash values, timestamps, and block numbers for each block of the object. The timestamp (tEnd) of Table 1110 represents the last time that the data in the reverse delta object was valid and the Hash entry represents the hash of the entire block at that time.

Using an example for block 2, to perform a restore of latest version, simply retrieve object A472 . . . 3D7/2/Full. To perform a restore from timestamp <tx>, find all incremental backups for block 2 where tEnd>=<tx> sorted by tEnd in descending order and apply them against the full version of the object in descending order. To get block 2 at t10, no deltas are applied to the full. To get block 2 at t8, the reverse delta object where tEnd=t9 is applied to the full. To get block 2 at t4, the reverse delta object where tEnd=t9 is applied against the full followed by applying the delta object where tEnd=t6, and so on.

During a backup operation, either the client may send the hash for each block or the server may compute the hash. For this embodiment, the delta container 704 can include entries for the block hash or hashes. During a restore operation, the hash value is checked to determine if the data needs to be sent.

As described, embodiments of the DOSS system 200 employ a reverse delta method that optimizes system performance for the most common restore workflow, that is, recovery of the most recent version of a data source. This method maintains resource efficiency by only storing the changed data, and by mapping stored data for restore processes that more closely match how users actually want data to be restored with respect to recovery time objectives. The system leverages a catalog to record the start time and end time of each version of data per block. It also decouples the client from the server, which enables many server enhancements to occur without requiring changes to clients. The system represents a great improvement over existing technologies that do not employ various efficiencies or optimize for restoring of the most recent version of a data source, such as those that simply identify identical runs of data between data sources and use fingerprints to avoid storing duplicate data.

Although embodiments may be described with respect to the data backup operations and applications, it should be noted that other network-based applications that process and store data objects may also be used. Such applications can include content creation and applications as well as data movement applications.

Data Retention Cost Control

As stated above, the cloud network 110 may be implemented as a public cloud network provided by a public cloud provider. At present, popular cloud providers include Amazon, which provides the Amazon Simple Storage Service ("AWS S3") for object storage accessible through a web service interface, Google Cloud, or Microsoft Azure, among other similar services.

Access and use of the public cloud through such providers is typically provided under a subscription basis where the user pays for service based on specific pricing plans covering storage, retrieval requests, data transfers, management/analytics, replication, and other activities. For example, the providers have different prices for storing objects in storage buckets, such as based on object size, storage duration, and storage class. With respect to storage class, cloud providers often provide several (e.g., three) different tiers of storage offering different performance characteristics and ranging from most expensive to least expensive. As customers store their backup data in the public cloud, they incur monthly storage costs to retain their data sources. As stated above, users must often trade off the cost of storage against the data retention period and the performance of storage.

As shown in FIG. 1, embodiments of the overall DOSS system 100 include a cost control component 118 that interacts with the cloud provider and user to allow a user to specify different retention period and the tiering periods, evaluate the costs of these choices and cause a backup system to apply a specific set of retention and tiering periods to one or more data sources.

This component works with or is included in the DOSS server 108 as it performs the direct write to object store 134 processes synthesized full backups using reverse delta objects as described above. In this process, multiple versions of a single data source are efficiently stored by only storing the most recent full version and reverse or undo incrementals for previous backups that result in data changes. The undo data is used to transform the most recent version of a data source (or a portion of a data source) to its state at an earlier point in time.

Specifically, the example illustrated in FIG. 11, shows that a data mover (client) will send a full block upon the first backup and then a delta for each succeeding backup (t1 through t4). Although a single delta is shown on the client 1002 for each point in time, in practice, the data mover may send zero or more delta objects per point in time based upon the regions of data that are changed in a block per backup operation.

Continuing with FIG. 11 as an example, the object store 1004 state is shown for each point in time. For instance at time t2, there exists three objects while at time t4 there are five objects using the idealized example of a one delta record per backup point in time. At t4, the present or most recent time, there exists the full data block at t4 and the instructions or undo records encapsulated in the reverse data objects (e.g., t1→t0) that allow the 'Full at t4' backup image to be transformed to its former full states at each of times t3, t2, t1 or t0. Thus, if the client requested the data at time t2, the system would take the full at t4 record, apply the t4→t3 reverse delta object followed by the t3→t2 reverse delta object to synthesize the 'Full at t2' backup image.

This example process illustrates the increased amount of work it takes to restore backup images or datasets as they go further back in time. Furthermore, the above example applies to a single block within a data source. It should be noted that a data source is typically broken into a sequential set of fixed size blocks. Thus, if a block size of 4 MB was employed on a 12 MB data source, there would be three blocks (0 MB-4 MB, 4 MB-8 MB and 8 MB-12 MB), further increasing the amount of processing required.

Public cloud providers generally offer multiple different storage tiers, where each tier has different characteristics such as cost, latency and reliability. Cheaper storage is slower to access and/or less reliable, while the fastest and most reliable storage class is the most expensive storage option. In an embodiment, the cost control component 118 includes processes or sub-components that provides users the ability to evaluate and specify the cost, retention period and tiering period trade-offs for their data sources, where a tiering period is a point in time (e.g., 90 days ago) when data can be moved or stored in a different tier (typically a cheaper tier). For the example shown in FIG. 11, each data block is stored as a full block image for the most recent point in time. To transform the data backwards in time, one or more reverse delta objects (i.e., undo records) are applied to this full at t0 block backup image. Due to this organization, older data can be moved to cheaper storage by simply tiering it down. Except for metadata management, there is no computation required to tier data down (or up).

Figure 13:
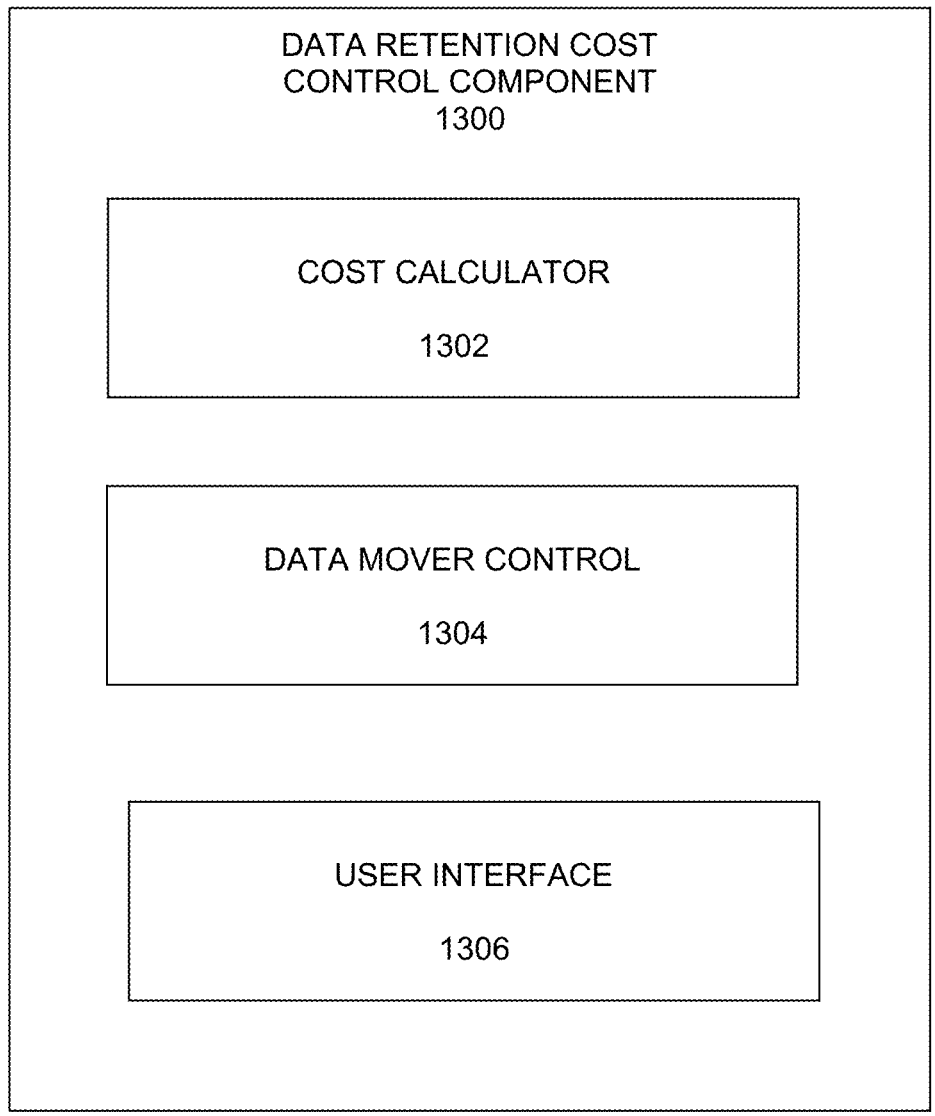
FIG. 13 illustrates some functional components of a data retention cost control component for use with public cloud-based object storage, under some embodiments.

FIG. 13 illustrates some functional components of a data retention cost control component for use with public cloud-based object storage, under some embodiments. For the embodiment of FIG. 13, the data retention cost control component 1300 includes a cost calculator to calculate storage costs for different storage tiers of the cloud provider, a data mover control to directly move data from one tier to another outside of any automatic data tiering schedules, and a user interface to accept user input and display cost data produced by the cost calculator 1302.

Figures 14A, 14B, 15:
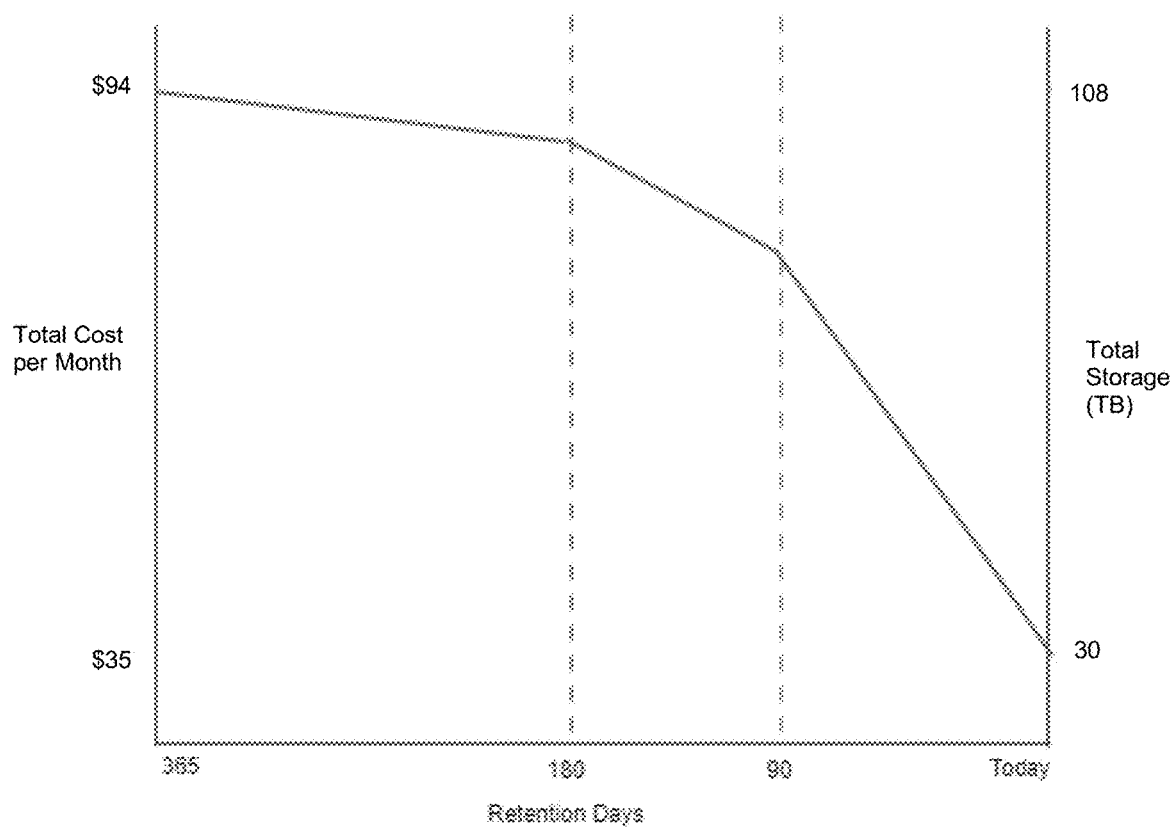
FIG. 14A shows an example tiered pricing schedule for a cloud service provider, under an example embodiment.
FIG. 14B illustrates an example user interface for entry of user specified storage tiering parameters, under an example embodiment.
FIG. 15 is an example graph showing a cost curve for different parameter settings the example tables of FIGS. 14A and 14B in an example embodiment.

In an example embodiment, it is assumed that a cloud provider offers three tiers of cloud storage, as shown in Table 1402 of FIG. 14A. This simple example shows the storage cost per unit of data (GB) per month for each of the three tiers denoted "Hot," "Warm" and "Cold." The Hot tier is ostensibly used to store only the most important (e.g., recent) data, and as the data ages it is moved to the warm tier (e.g., after 3 months) and then to the Cold tier (e.g., after 6 months). The movement from hot tier to cold tier could be done through an automatic tiering process that moves datasets based on their age (e.g., >=3 months, >=6 months, etc.), or it may be done manually by a user at set periods or on a customized or on-demand schedule. In some cases, stored data may also be tiered up from cold to warm or hot tiers depending on specific data access needs, and so on.

The user interface 1306 allows the user to specify the retention (or tiering) periods in a simple table. Table 1404 of FIG. 14B illustrates an example user interface for entry of user specified storage tiering parameters, under an embodiment. The 'days' column indicates the number of days that data is allowed to remain in a particular tier according to a defined tiering schedule, before it is moved down to the lower (colder) tiers. This number of days is referred to as the retention period or tiering period. For the example of FIG. 14B, the user has specified that their data should remain in the Hot tier for the most recent 90 days. After 90 days, the data will be moved from the cloud provider's Hot tier to the Warm tier. Likewise, when data is 180 days old it will be moved from Warm to Cold storage. After 365 days the data will be removed from storage entirely (deleted).

The cost calculator 1302 calculates the total cost of storing the data in a tier for the specified storage cost period using a current cloud provider pricing schedule. This calculated cost is then displayed to the user in the "Cost" column of table 1404. Thus, depending on the size of the data source objects and the specified retention period (days), the system will compute the cost to retain the data in the various available tiers. As can be seen in FIG. 14B, for the dataset(s) the first 90 days of retention costs $59/month, the first 180 days costs $78/month. The user interface will allow the operator to specify one or more datasets (e.g., all datasets within a policy, datasets across multiple policies, etc.) to be analyzed and affected. The cost numbers will change in real time as the user changes, through the UI 1306, the specified number of days per tier. This allows the user to modify and see in real time their actual storage cost based on the selectable parameters of tier choice and retention periods.

In an embodiment, the cost control component 1300 can also be configured to provide cost analysis tools to the user through the user interface 1306. One such tool is a graph drawing tool that generates a graph showing a cost curve for different parameter settings in table 1404, and price schedules 1402. FIG. 15 is an example graph 1500 having an example plot 1502 that reflects the prices and settings of the tables 1402 and 1404 for the selected data source(s). This graph tool shows quite explicitly how the storage cost changes based on the monthly storage costs and the specified retention periods per tier. This graphical output can assist the user in directly perceiving and understanding the cost/storage trade-off for the cloud-based objects storage.

The cost control components being viewed and controlled can support one or more data sources. These may be a single data source, a collection of data sources (policy) or a set of policies. FIG. 5 illustrates an example of a data source 500, and these are blocks sent by a data mover such as a VM, a file, a set of files or whatever granularity the administrator has configured to be backed up as a single entity. Once the user has selected the values that meet their objectives in terms of cost, tiering periods and overall retention period they can apply these settings to the data source(s). For the examples shown, the retention parameters, calculated costs, and graphical output are applied whatever set of one or more data sources that the user has chosen to affect using the same retention tiering periods. Similar information can be provided for multiple data source groups by providing the appropriate specification to the cost control component 1300. The user can select a set of data sources (forming a data source group) and control each one individually using the same interface. Such data source grouping is helpful for users that may have upwards of tens of thousands of data sources.

In an embodiment, advanced GUI tools can also be used such as an interactive graph, where the user can move, on the graph itself, the dotted tiering period lines to specify different days in the retention period of table 1404. The customer may use this GUI tool or the table 1404 to manipulate and changes any input. In real time, all changes will be recomputed and shown.

Data can be moved as desired by the user by either explicitly changing the retention period (on the table or graph), which may cause objects to be moved between tiers and potentially deleted. For example, if the Hot tiering period was changed (shortened) from 90 days to 80 days, then the oldest 10 days of objects in the Hot tier will be migrated from the Hot tier to the Warm tier. Likewise, lengthening a retention period may move objects from the Warm tier to the Hot tier. If it is desired to immediately move data out of a tier, the number of days can be set to zero or any number of days less than the amount of time the data has currently been in that tier. Alternatively, the data mover controller 1304 can be used to explicitly move the data through an explicit data storage routing command.

Figure 16:
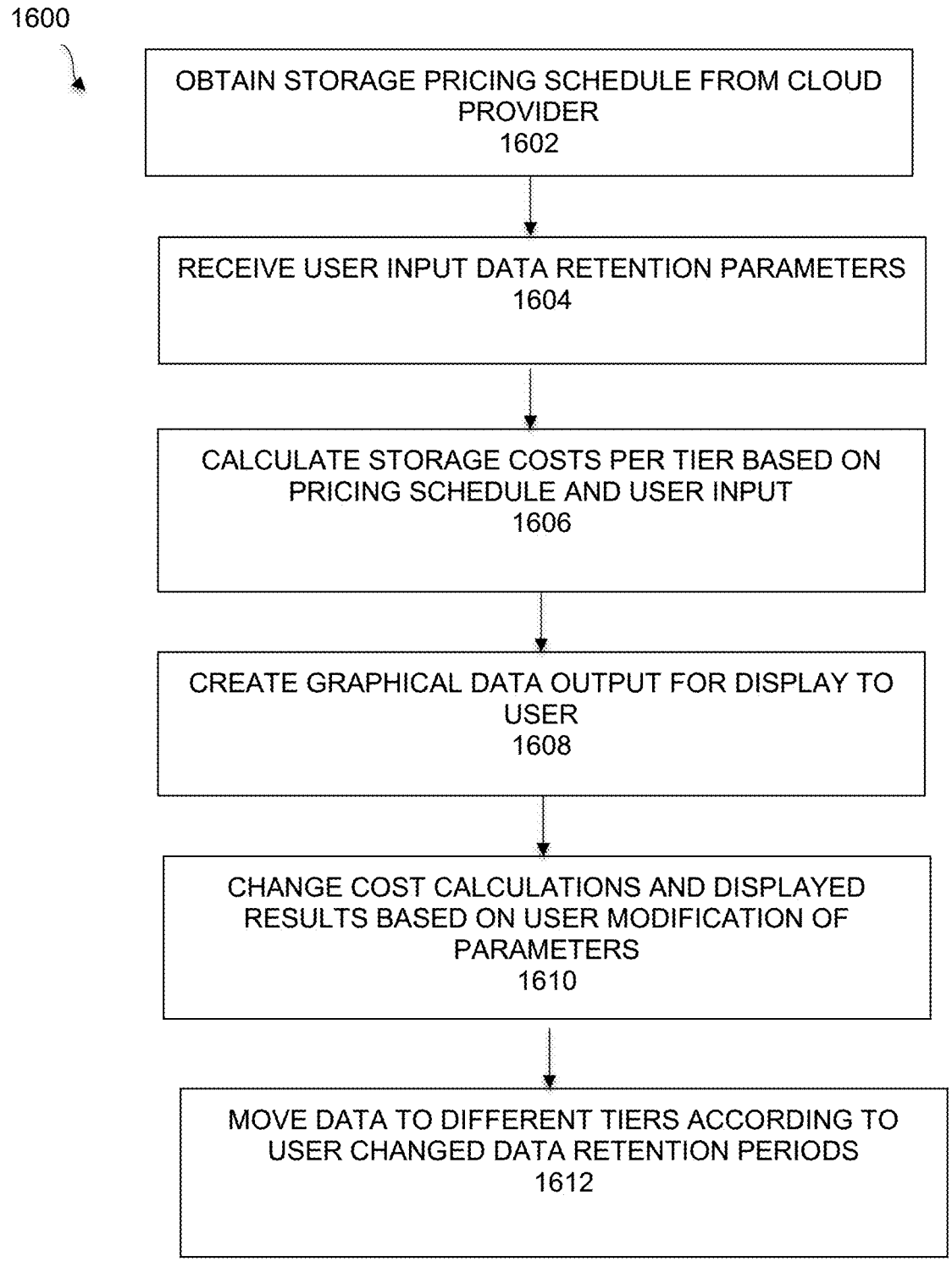
FIG. 16 illustrates a method of providing data retention cost control in a DOSS system, under some embodiments.

FIG. 16 illustrates a method of providing data retention cost control in a DOSS system, under some embodiments. As shown in FIG. 16, process 1600 begins with the cost control component 1300 accessing or obtaining information about the current storage prices from a cloud provider with respect to their different available tiers, 1602. The component then receives user input for the different possible retention parameters, 1604. These parameters include an identity of the data source or sources, and the retention period (days) per storage tier. The cost calculator 1302 calculates the cost per time unit (e.g., months) for each storage tier based on the current provider-specified price and the user-specified period, 1606. It then provides these calculated costs through the UI in one or both of tabular and graphical formats, 1608. The UI 1306 allows the user to change certain parameters, such as the retention periods and/or data sources, and any impact of such changes on the cost will be calculated and reflected in real time in the graphical display, 1610. If the user changes the retention period to force an immediate movement of data from one tier to another, the data mover control 1304 this movement in the cloud object storage, 1306.

In an embodiment, the data retention cost control process of FIG. 16 can be applied directly to the DOSS system to facilitate the automatic movement of older backup images stored at various previous points in time from one storage tier to another (colder) storage tier to further reduce storage cost overhead. For this embodiments PIT backups that are outside of a current retention period for a particular tier will be automatically moved to a lower tier for storage, and eventually deleted from the cloud storage entirely. A data restore request to retrieve a full backup image for an old PIT backup will cause the full backup at that PIT to be synthesized using the appropriate undo records (reverse delta objects), and will also move that PIT backup data out of the lower tier and into the upper or Hot tier, if so configured.

In certain cases, embodiments may be described with respect to implementation in an Amazon AWS S3, Microsoft Azure, or Google storage systems for ease of illustration, however embodiments are not so limited, and can be applied to any other or similar commercial or third party-based cloud and web service platform providing object storage.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 17:
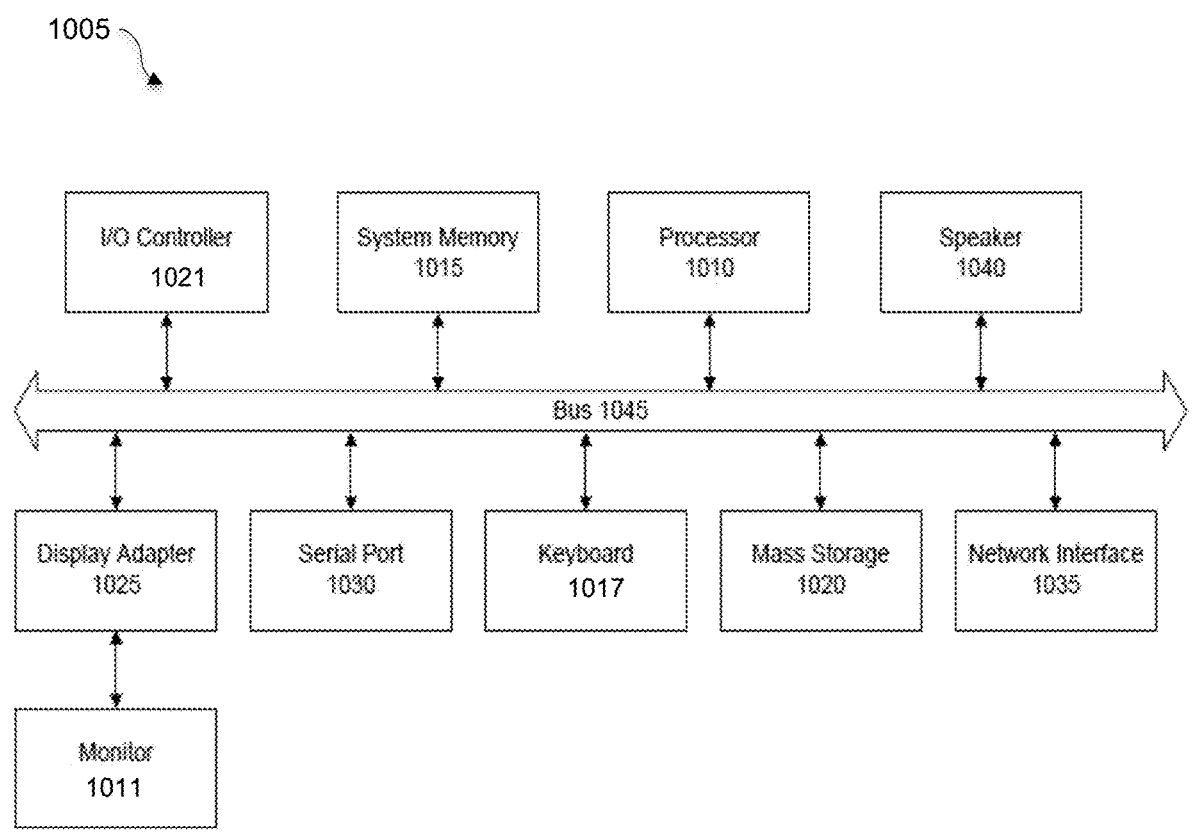
FIG. 17 is a system block diagram of a computer system used to execute one or more software components of a direct to object store process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 17 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of controlling data retention costs in cloud-based object storage organized into different storage tiers, the method comprising:
    obtaining current storage prices from a provider of the cloud-based object storage for the different storage tiers;
    receiving, through a user interface, user input for one or more retention parameters comprising an identity of a data source of data to be stored, and the retention period of the data in each storage tier;
    calculating, by a processor-based component, a cost per time unit for each storage tier based on the current storage prices and the user-specified retention period;
    displaying, through a graphical user interface, the calculated costs to the user;
    receiving a change in one of data source or retention period of at least one of the tiers through the user interface; and
    updating, in real time, the calculated costs displayed to the user as a result of the change.

2. The method of claim 1 wherein the storage tiers are distinguished on the basis of cost per unit time per storage unit, read/write performance, and reliability.

3. The method of claim 2 wherein the storage tiers comprise at least three tiers organized as a most expensive tier, a less expensive tier, and a least expensive tier.

4. The method of claim 3 further comprising:
receiving, through the user interface, a change to the retention period for a specific tier; and
automatically moving data from the specific tier to another tier of the changed retention period is outside of an allowable retention period.

5. The method of claim 1 wherein the calculated costs are displayed to the user in one of a tabular form or in a graphical plot form.

6. The method of claim 5 wherein the graphical plot form is generated by a graphing tool, and wherein the received change is made directly by the user on the displayed graph.

7. The method of claim 1 wherein the data to be stored comprises backup data written directly to the cloud-based object storage, and comprises one or more undo records that, when combined with a full backup image at a present point in time, synthesizes a full backup at a point in time (PIT) specified in a data restore request in a full block synthesis process.

8. The method of claim 7 wherein the one or more undo records for points in time successively preceding the present point in time are stored in successively lower tiers in terms of storage cost, and are moved among the tiers according to a defined storage schedule.

9. The method of claim 8 wherein the data restore request will cause an undo record for the specified point in time to be moved to a higher tier in terms of storage cost if it is currently in a lower tier.

10. The method of claim 7 wherein the full block synthesis process comprises:
storing the full backup image in the object store;
creating a set of forward delta objects reflecting a change of blocks between the full backup and each incremental backup to the PIT requested in the data store request;
deriving reverse delta objects for each forward delta object; and
creating, for each block of each of the incremental backups, synthesized full backup blocks by applying a respective reverse delta object to the full backup.

11. A system for controlling data retention costs in cloud-based object storage organized into different storage tiers, the system comprising a processor executing:
a cost control component obtaining current storage prices from a provider of the cloud-based object storage for the different storage tiers;
a user interface receiving user input for one or more retention parameters comprising an identity of a data source of data to be stored, and the retention period of the data in each storage tier;
a cost calculator calculating a cost per time unit for each storage tier based on the current storage prices and the user-specified retention period; and
a graphical user interface displaying the calculated costs to the user, receiving a change in one of data source or retention period of at least one of the tiers through the user interface, and updating, in real time, the calculated costs displayed to the user as a result of the change.

12. The system of claim 11 wherein the storage tiers are distinguished on the basis of cost per unit time per storage unit, read/write performance, and reliability, and comprise at least three tiers organized as a most expensive tier, a less expensive tier, and a least expensive tier.

13. The system of claim 12 wherein the user interface further receives a change to the retention period for a specific tier, and the processor further executes a data mover automatically moving data from the specific tier to another tier of the changed retention period is outside of an allowable retention period.

14. The system of claim 11 wherein the graphical user interface displays the calculated costs to the user in one of a tabular form or in a graphical plot form.

15. The system of claim 14 wherein the graphical plot form is generated by a graphing tool and displayed, and wherein the received change is made directly by the user on the displayed graphical plot form.

16. The system of claim 11 wherein the data to be stored comprises backup data written directly to the cloud-based object storage, and comprises one or more undo records that, when combined with a full backup image at a present point in time, synthesizes a full backup at a point in time (PIT) specified in a data restore request in a full block synthesis process.

17. The system of claim 16 wherein the one or more undo records for points in time successively preceding the present point in time are stored in successively lower tiers in terms of storage cost, and are moved among the tiers according to a defined storage schedule.

18. The system of claim 17 wherein the data restore request will cause an undo record for the specified point in time to be moved to a higher tier in terms of storage cost if it is currently in a lower tier.

19. The system of claim 16 wherein the full block synthesis process comprises:
storing the full backup image in the object store;
creating a set of forward delta objects reflecting a change of blocks between the full backup and each incremental backup to the PIT requested in the data store request;
deriving reverse delta objects for each forward delta object; and
creating, for each block of each of the incremental backups, synthesized full backup blocks by applying a respective reverse delta object to the full backup.

* * * * *